(12) United States Patent
Hori et al.

(10) Patent No.: US 10,974,734 B2
(45) Date of Patent: Apr. 13, 2021

(54) DRIVING ASSISTANCE DEVICE, DRIVING ASSISTANCE METHOD, AND NON-TRANSITORY COMPUTER-READABLE STORAGE MEDIUM STORING DRIVING ASSISTANCE PROGRAM

(71) Applicant: Toyota Jidosha Kabushiki Kaisha, Toyota (JP)

(72) Inventors: Takashige Hori, Aisai (JP); Makoto Akahane, Nagoya (JP); Ken Ishikawa, Nagakute (JP); Masatoshi Takahara, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 309 days.

(21) Appl. No.: 16/223,683

(22) Filed: Dec. 18, 2018

(65) Prior Publication Data

US 2019/0210618 A1 Jul. 11, 2019

(30) Foreign Application Priority Data

Jan. 11, 2018 (JP) .............................. JP2018-002834

(51) Int. Cl.
| | |
|---|---|
| *B60W 50/14* | (2020.01) |
| *B60W 30/18* | (2012.01) |
| *B60W 50/00* | (2006.01) |
| *B60W 30/00* | (2006.01) |
| *B60W 40/06* | (2012.01) |

(52) U.S. Cl.
CPC ............ *B60W 50/14* (2013.01); *B60W 30/00* (2013.01); *B60W 30/18* (2013.01); *B60W 40/06* (2013.01); *B60W 50/0097* (2013.01); *B60W 2520/105* (2013.01); *B60W 2552/00* (2020.02); *B60W 2552/15* (2020.02); *B60W 2554/80* (2020.02); *B60W 2555/60* (2020.02); *B60W 2556/65* (2020.02); *B60W 2710/30* (2013.01)

(58) Field of Classification Search
CPC .. B60W 50/14; B60W 30/18; B60W 2552/00; B60W 2552/15; B60W 2554/80; B60W 2555/60; B60W 2556/65; B60W 2710/30; B60W 2520/105; B60W 50/0097; B60W 30/00; B60W 40/06
See application file for complete search history.

(56) References Cited

U.S. PATENT DOCUMENTS

| | | | | |
|---|---|---|---|---|
| 2014/0188365 | A1* | 7/2014 | Nagata | .................. G08G 1/166 701/93 |
| 2020/0324759 | A1* | 10/2020 | Sakuma | ................ B60W 50/14 |

FOREIGN PATENT DOCUMENTS

JP 2011-025735 A 2/2011

* cited by examiner

*Primary Examiner* — Russell Frejd
(74) *Attorney, Agent, or Firm* — Dinsmore & Shohl LLP

(57) ABSTRACT

A vehicle driving assistance device includes: a control unit configured to identify a point at which a vehicle speed is likely to increase, based on vehicle information collected from a plurality of vehicles, the vehicle information including position information for each of the vehicles and situation information for each of the plurality of vehicles. The control unit is configured to decide whether there is a vehicle deceleration factor due to which the vehicle speed decreases within an area in which a vehicle travels a prescribed distance from the point identified by the control unit. The control unit is configured to alert a driver that there is the vehicle deceleration factor, when there is the vehicle deceleration factor.

6 Claims, 2 Drawing Sheets

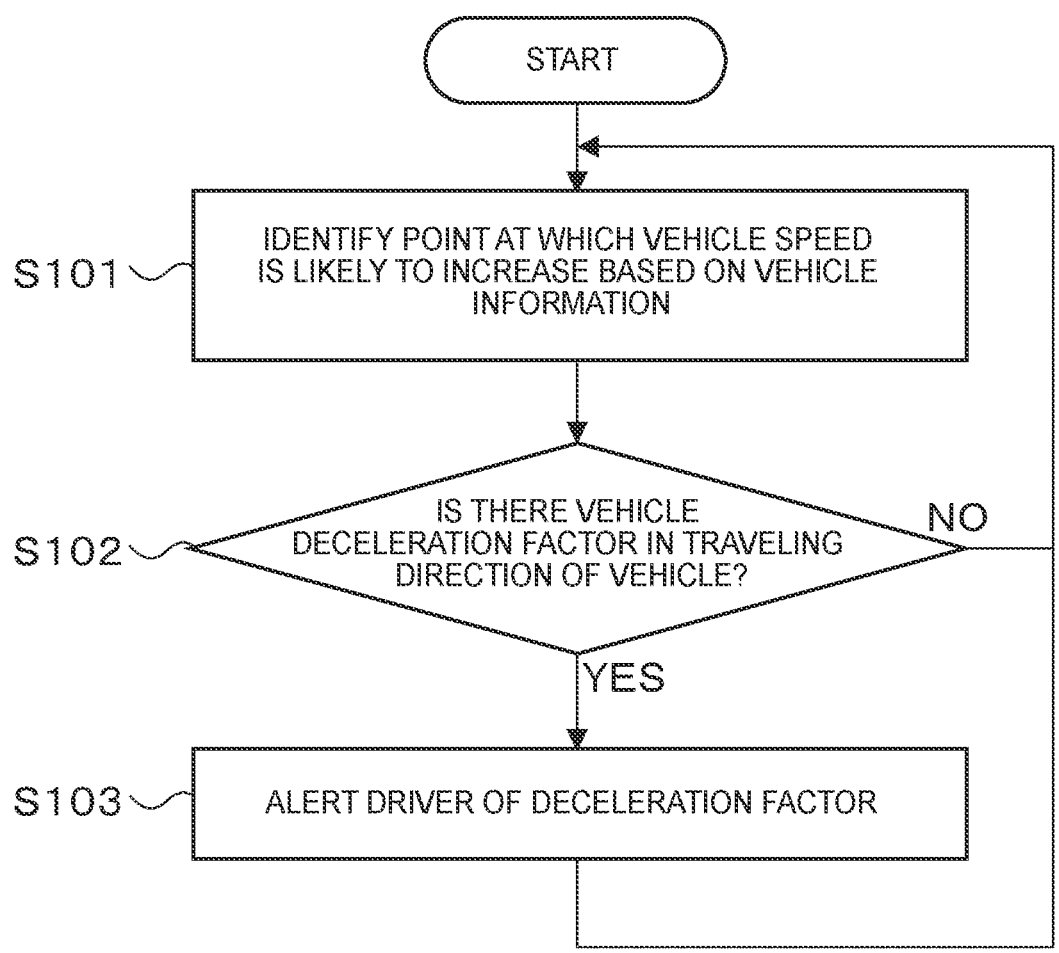

DRIVING ASSISTANCE DEVICE, DRIVING ASSISTANCE METHOD, AND NON-TRANSITORY COMPUTER-READABLE STORAGE MEDIUM STORING DRIVING ASSISTANCE PROGRAM

CROSS-REFERENCE TO RELATED APPLICATIONS

This application claims priority to Japanese Patent Application No. 2018-002834 filed on Jan. 11, 2018, which is incorporated herein by reference in its entirety including the specification, drawings and abstract.

BACKGROUND

1. Technical Field

The present disclosure relates to a driving assistance device, a driving assistance method, and a non-transitory computer-readable storage medium storing driving assistance program.

2. Description of Related Art

In Japanese Patent Application Publication No. 2011-25735 (JP 2011-25735 A), a notification device for a vehicle which alerts a driver to prompt the driver to reduce vehicle speed at a suitable timing is disclosed. In JP 2011-25735 A, it is decided whether a value indicating a vehicle speed or an accelerator operation amount, which is input as vehicle information, tends to increase at prescribed intervals, and when the value tends to increase, a notification unit is operated.

SUMMARY

There are various factors for prompting the driver to decelerate the vehicle. However, in JP 2011-25735 A, the disclosure is limited to prompting deceleration when the value indicating the vehicle speed or the accelerator operation amount tends to increase. Thus, the alert to the driver is not enough and there is room for improvement from a viewpoint of convenience.

The present disclosure provides a driving assistance device, a driving assistance method, and a non-transitory computer-readable storage medium storing driving assistance program that are able to improve convenience of a driver with issuance of an alert.

An aspect of the disclosure relates to a driving assistance device. The driving assistance device has a control unit configured to identify a point at which a vehicle speed is likely to increase, based on vehicle information collected from a plurality of vehicles, the vehicle information including position information for each of the vehicles and situation information for each of the vehicles. The control unit is configured to decide whether there is a vehicle deceleration factor due to which the vehicle speed decreases within an area in which a vehicle travels a prescribed distance from the point identified by the control unit, and the control unit is configured to alert a driver that there is the vehicle deceleration factor, when there is the vehicle deceleration factor.

In the aspect described above, the vehicle deceleration factor may be at least one of the following: an indication of temporary stop; a narrowing road width; a congested road; or a point at which the vehicle speed is likely to decrease.

In the aspect described above, the control unit may be configured to determine, based on the vehicle information, that there is a point at which a vehicle elevation decreases by a value equal to more than a prescribed value, the vehicle speed increases by a speed equal to more than a prescribed speed, and a variation of an accelerator operation amount is within a prescribed range, and the control unit may be configured to identify the point as a point at which the vehicle speed is likely to increase.

In the aspect described above, the control unit may be configured to determine, based on the vehicle information, that there is a point at which a variation of a vehicle elevation is within a prescribed range, the vehicle speed increases by a speed equal to or more than a prescribed speed, and an accelerator operation amount increases by an amount equal to or more than a prescribed amount, and the control unit is configured to identify the point as a point at which the vehicle speed is likely to increase.

Another aspect of the disclosure relates to a driving assistance method. The driving assistance method includes: identifying a point at which a vehicle speed is likely to increase, based on vehicle information collected from a plurality of vehicles, the vehicle information including position information for each of the vehicles and situation information for each of the vehicles; deciding whether there is a vehicle deceleration factor due to which the vehicle speed decreases within an area in which a vehicle travels a prescribed distance from the identified point; and alerting a driver that there is the vehicle deceleration factor, when there is the vehicle deceleration factor.

Yet another aspect of the disclosure relates to a non-transitory computer-readable storage medium storing a driving assistance program for executing a vehicle driving assistance method. The driving assistance method includes: identifying a point at which a vehicle speed is likely to increase, based on vehicle information collected from a plurality of vehicles, the vehicle information including position information for each of the vehicles and situation information for each of the vehicles; deciding whether there is a vehicle deceleration factor due to which the vehicle speed decreases within an area in which a vehicle travels a prescribed distance from the identified point; and alerting a driver that there is the vehicle deceleration factor when there is the vehicle deceleration factor.

With the above configurations, it is possible to improve convenience of a driver with issuance of an alert.

BRIEF DESCRIPTION OF THE DRAWINGS

Features, advantages, and technical and industrial significance of exemplary embodiments will be described below with reference to the accompanying drawings, in which like numerals denote like elements, and wherein:

FIG. 3 is a flowchart for explaining an operation of the driving assistance system according to the embodiment.

DETAILED DESCRIPTION OF EMBODIMENTS

Figure 1:
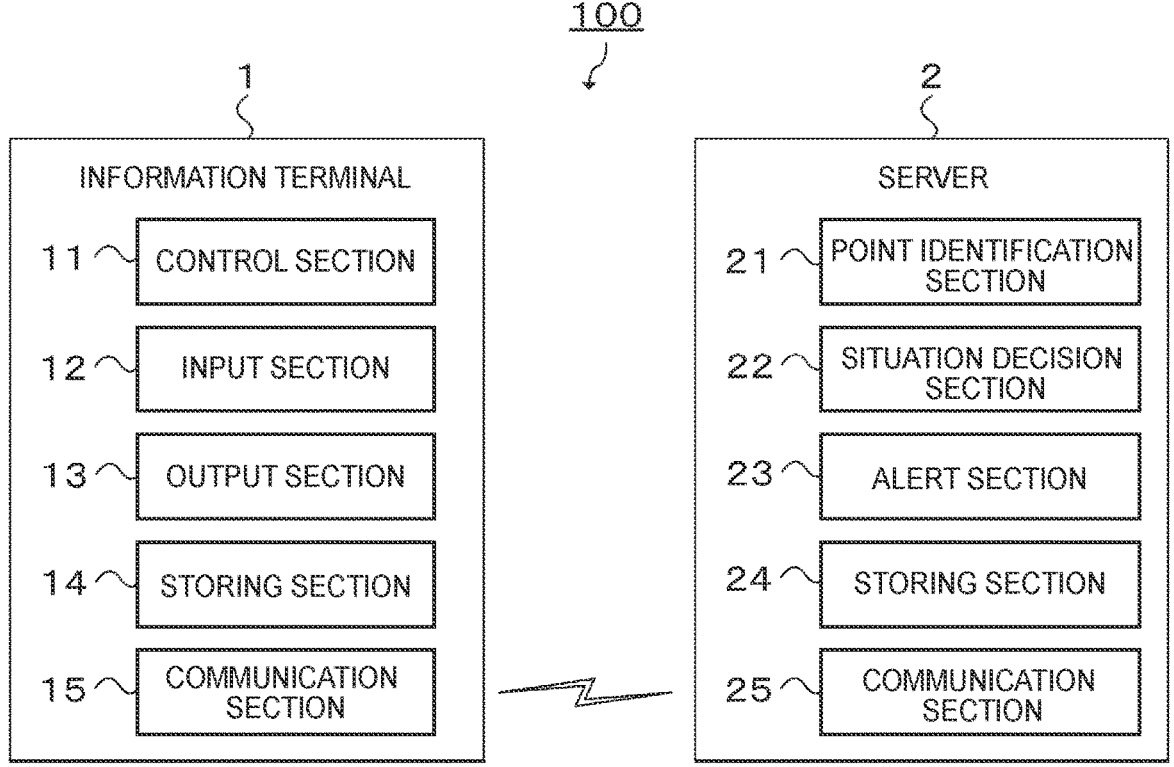
FIG. 1 illustrates an example of a configuration of a driving assistance system according to an embodiment.

An embodiment will be described with reference to the attached drawings. In the drawings, elements with the same reference signs have the same or similar configurations.

The configuration of a driving assistance system according to the embodiment will be described with reference to FIG. 1. For example, a driving assistance system 100 includes an information terminal 1 that a user uses and a server 2 that is disposed at a data center etc. The information terminal 1 and the server 2 are configured so that they can communicate with each other via a network including a wireless network, for example.

The information terminal 1 illustrated in FIG. 1 is a terminal device such as a vehicle navigation device, an on-vehicle device with a navigation function, or a smart phone. The information terminal 1 has a control section 11, an input section 12, an output section 13, a storing section 14, and a communication section 15 etc. as a functional configuration. The information terminal 1 has a control unit including a central processing unit (CPU) and a memory, an operation section, a display, a speaker, a storing unit, and a communication unit etc., as a physical configuration. The CPU executes a prescribed program stored in the memory to realize functions of the control section 11, the input section 12, the output section 13, the storing section 14, and the communication section 15.

The server 2 has a point identification section 21, a situation decision section 22, an alert section 23, a storing section 24, and a communication section 25 etc., as a functional configuration. The server 2 has a control unit including a CPU and a memory, a storing unit, and a communication unit etc., as a physical configuration. The CPU executes a prescribed program stored in the memory to realize functions of the point identification section 21, the situation decision section 22, the alert section 23, the storing section 24, and the communication section 25. The functions of the point identification section 21, the situation decision section 22, and the alert section 23 will be described in detail below.

The point identification section 21 identifies a point at which the vehicle speed is likely to increase, based on vehicle information collected from a plurality of vehicles. The vehicle information is stored in the storing unit.

Position information for the vehicle, situation information for the vehicle, attribute information for the vehicle, and the time at which the data was collected etc. are included in the vehicle information. Speed information and accelerator operation amount information for the vehicle etc. are included in the situation information for the vehicle.

The point identification section 21 identifies a point at which the vehicle speed is likely to increase, based on the vehicle information. For example, a downward slope and a flat straight road correspond to the point at which the vehicle speed is likely to increase.

Figure 2:
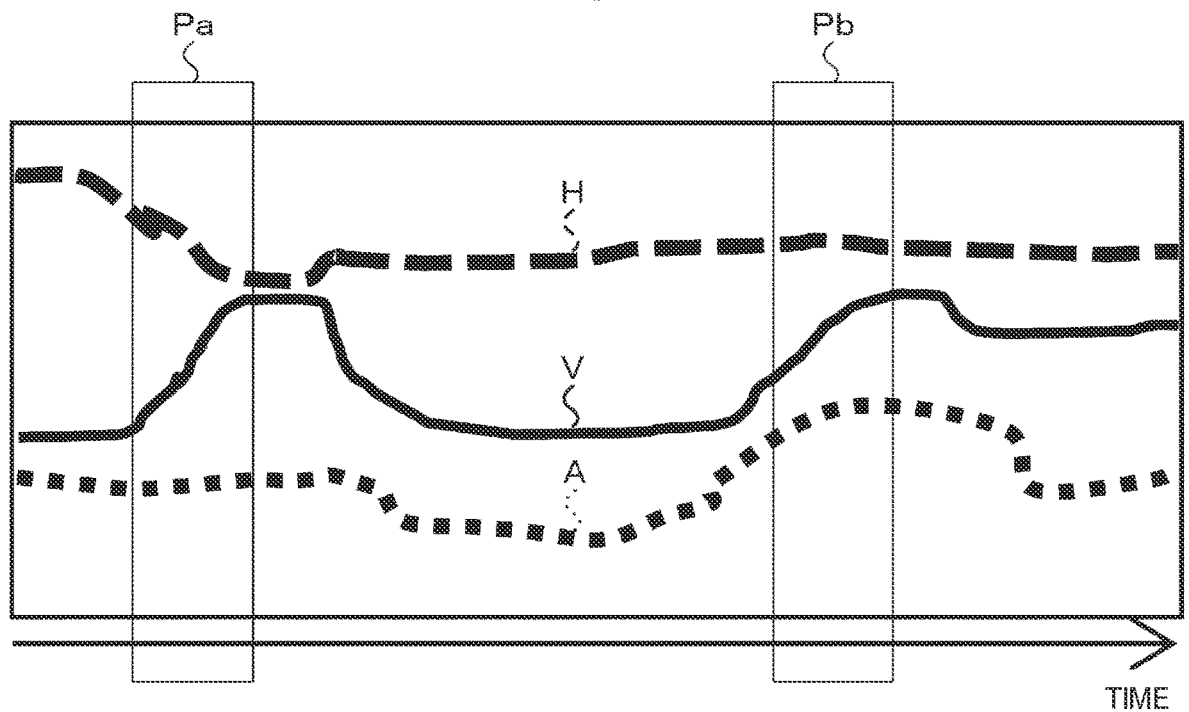
FIG. 2 is a graph illustrating a transition of elevation, speed, and accelerator operation amount of a vehicle.

Identification of the point at which the vehicle speed is likely to increase will be described in detail referring to FIG. 2. FIG. 2 is a graph illustrating a transition of a vehicle elevation H, a vehicle speed V, and an accelerator operation amount A, of a vehicle. The vehicle elevation H, the vehicle speed V, and the accelerator operation amount A can be decided based on the vehicle information.

A point Pa indicated in FIG. 2 is a downward slope. The point Pa is point at which the vehicle elevation H decreases, the vehicle speed V increases, and the accelerator operation amount A hardly changes. In this way, the speed tends to increase at the downward slope, even if the accelerator pedal is not stepped on.

Thus, the point identification section 21 identifies the point as a downward slope based on the vehicle information, when there is a point at which the vehicle elevation H decreases by a value equal to or more than the prescribed value, the vehicle speed V increases by a value equal to or more than the prescribed value, and the variation of the accelerator operation amount A is within the prescribed range. The point identification section 21 then decides that the point Pa is a point at which the vehicle speed is likely to increase.

The point Pb indicated in FIG. 2 is a flat straight road. The point Pb is a point at which there is hardly any variation in the vehicle elevation H, the vehicle speed V increases, and the accelerator operation amount increases. In this way, on the flat straight road, the driver tends to step on the accelerator pedal and accelerate the vehicle.

Thus, when there is a point at which the variation of the vehicle elevation is within a prescribed range, the vehicle speed increases by a speed equal to or more than a prescribed speed, and the accelerator operation amount increases by a prescribed amount or more, the point identification section 21 decides that a road is a flat straight road and identifies the point Pb as a point at which the vehicle speed is likely to increase, based on the vehicle information.

The description will return to FIG. 1. The situation decision section 22 decides whether there is a vehicle deceleration factor due to which the vehicle speed decreases within an area in which the vehicle travels a prescribed distance from the point identified by the point identification section 21. The vehicle deceleration factors include: an indication of a temporary stop; a narrowing road width; a congested road; and a point at which the vehicle speed is likely to decrease etc.

It is possible to decide whether there is the vehicle deceleration factor in a traveling direction of the vehicle based on map information and traffic information etc.

When there is the deceleration factor, the alert section 23 alerts the driver that there is the deceleration factor. The alert is performed by outputting from the speaker of the information terminal 1 or by indicating on the display of the information terminal 1, a message such as "The road is congested ahead of the continuous downward slope. Please drive at a decreased speed." or "Even if you accelerate now, there is a temporary stop ahead."

An example of an operation of the driving assistance system 100 according to the embodiment will be described with reference to FIG. 3.

First, the point identification section 21 identifies a point at which the vehicle speed is likely to increase, based on the vehicle information collected from the plurality of vehicles (step S101).

Then, the situation decision section 22 decides whether there is the vehicle deceleration factor within the area in which the vehicle travels the prescribed distance from the point identified in step S101 described above (step S102). When the decision results in "NO" (step S102; NO), the processing moves on to step S101 described above.

In step S102, when it is decided that there is the vehicle deceleration factor within the area in which the vehicle travels the prescribed distance from the identified point (step S102; YES), the alert section 23 alerts the driver that there is the deceleration factor (step S103). The processing then moves on to step S101.

As described above, in the driving assistance system 100 according to the embodiment, it is possible to identify the point at which the vehicle speed is likely to increase, decide whether there is the vehicle deceleration factor within the area in which the vehicle travels the prescribed distance from the identified point, and alert the driver that there is the deceleration factor when there is the vehicle deceleration factor, based on the vehicle information collected from the plurality of vehicles and including the position information for each of the vehicles and the situation information for each of the vehicles.

That is, based on the point at which the vehicle speed is likely to increase and the situation in which there is the deceleration factor ahead of the point, it is possible to suitably alert the driver.

Thus, in the driving assistance system 100 according to the embodiment, it is possible to improve the convenience of the driver with an alert.

Modification

The disclosure is not limited to the embodiment describe above, and may be implemented in various modes without departing from the scope of the disclosure. Thus, the embodiment described above is by way of example in all respects and should not be interpreted as limited. For example, the order of the processing steps described above may be changed as appropriate within a range in which inconsistency does not occur in content of processing, or the processing steps may be executed in parallel.

In the embodiment describe above, the server 2 has the point identification section 21, the situation decision section 22, and the alert section 23. However, the disclosure is not limited to this, and the information terminal 1 may have a part of or all of the functions of the point identification section 21, the situation decision section 22, and the alert section 23. Both the information terminal 1 and the server 2 can be the driving assistance device.

The components of the information terminal 1 and the server 2 are not limited to the components according to the embodiment described above, and any components may be added if necessary.

What is claimed is:

1. A vehicle driving assistance device, comprising:
a control unit configured to identify a point at which a vehicle speed is likely to increase, based on vehicle information collected from a plurality of vehicles, the vehicle information including position information for each of the vehicles and situation information for each of the plurality of vehicles;
wherein the control unit is configured to decide whether there is a vehicle deceleration factor due to which the vehicle speed decreases within an area in which a vehicle travels a prescribed distance from the point identified by the control unit; and
the control unit is configured to alert a driver that there is the vehicle deceleration factor, when there is the vehicle deceleration factor.

2. The vehicle driving assistance device according to claim 1, wherein
the vehicle deceleration factor is at least one of the following:
an indication of temporary stop;
a narrowing road width;
a congested road; or
a point at which the vehicle speed is likely to decrease.

3. The vehicle driving assistance device according to claim 1, wherein
the control unit is configured to determine, based on the vehicle information, that there is a point at which a vehicle elevation decreases by a value equal to more than a prescribed value, the vehicle speed increases by a speed equal to more than a prescribed speed, and a variation of an accelerator operation amount is within a prescribed range, and the control unit is configured to identify the point as a point at which the vehicle speed is likely to increase.

4. The vehicle driving assistance device according to claim 1, wherein
the control unit is configured to determine, based on the vehicle information, that there is a point at which a variation of a vehicle elevation is within a prescribed range, the vehicle speed increases by a speed equal to or more than a prescribed speed, and an accelerator operation amount increases by an amount equal to or more than a prescribed amount, and the control unit is configured to identify the point as a point at which the vehicle speed is likely to increase.

5. A vehicle driving assistance method, comprising:
identifying a point at which a vehicle speed is likely to increase, based on vehicle information collected from a plurality of vehicles, the vehicle information including position information for each of the vehicles and situation information for each of the plurality of vehicles;
deciding whether there is a vehicle deceleration factor due to which the vehicle speed decreases within an area in which a vehicle travels a prescribed distance from the identified point; and
alerting a driver that there is the vehicle deceleration factor, when there is the vehicle deceleration factor.

6. A non-transitory computer-readable storage medium storing a driving assistance program for executing a vehicle driving assistance method, the method comprising:
identifying a point at which a vehicle speed is likely to increase, based on vehicle information collected from a plurality of vehicles, the vehicle information including position information for each of the vehicles and situation information for each of the plurality of vehicles;
deciding whether there is a vehicle deceleration factor due to which the vehicle speed decreases within an area in which a vehicle travels a prescribed distance from the identified point; and
alerting a driver that there is the vehicle deceleration factor when there is the vehicle deceleration factor.

* * * * *